UNITED STATES PATENT OFFICE.

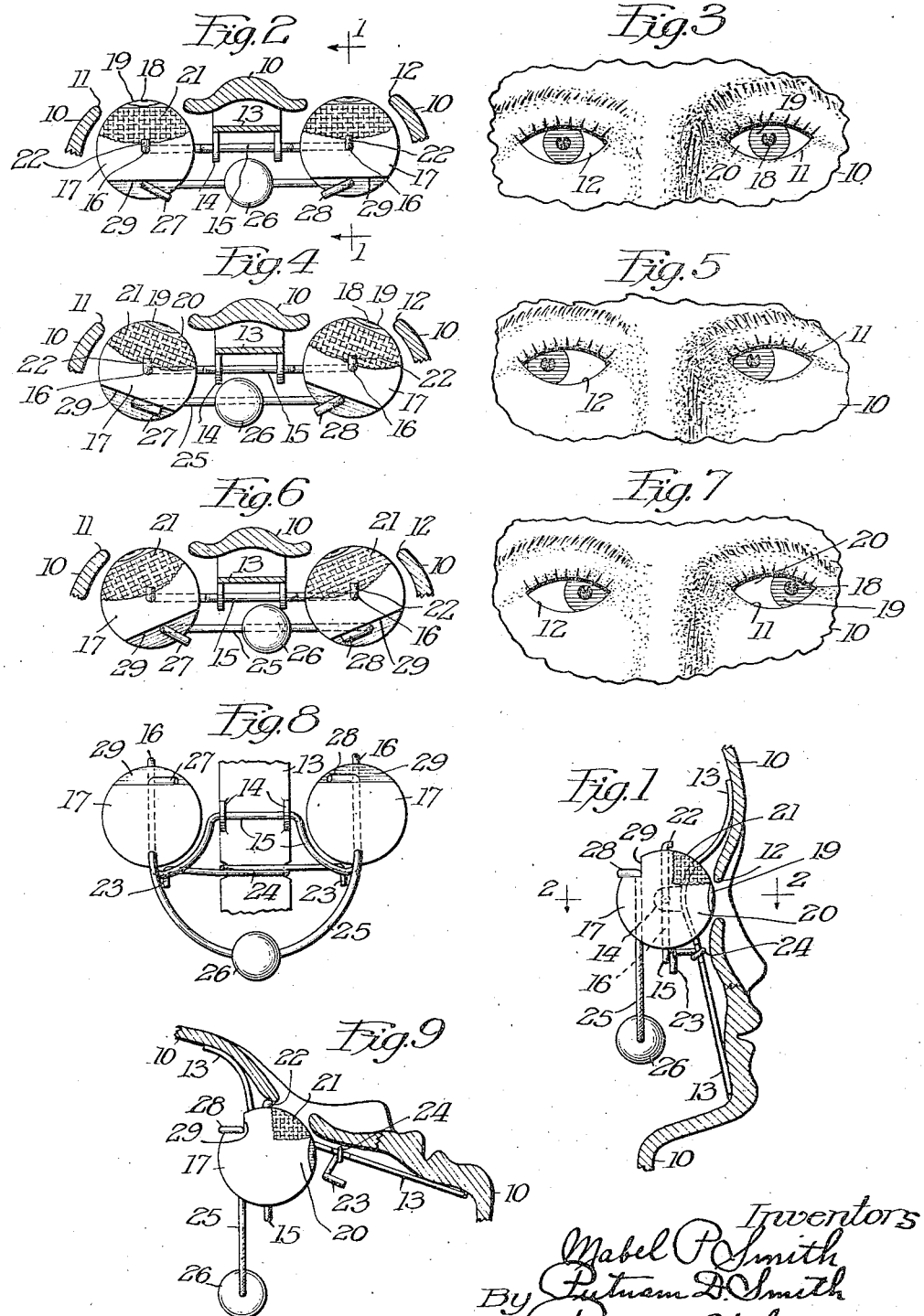

MABEL P. SMITH AND PUTNAM D. SMITH, OF SANTA CRUZ, CALIFORNIA.

DOLL'S EYES.

1,298,808.　　　　　Specification of Letters Patent.　　Patented Apr. 1, 1919.

Application filed January 6, 1917. Serial No. 140,878.

*To all whom it may concern:*

Be it known that we, MABEL P. SMITH and PUTNAM D. SMITH, citizens of the United States, residing at Santa Cruz, in the county of Santa Cruz and State of California, have invented certain new and useful Improvements in Dolls' Eyes, of which the following is a specification.

Our invention relates to masks having eye apertures and has for its primary object the provision of improved means whereby artificial eyes may be so supported adjacent the eye apertures of the mask that the natural facial expressions of the human being or animal represented by the mask may be simulated as far as movement of the eyes is concerned.

More particularly our invention relates to means in conjunction with the support for the eyes whereby they may be caused to turn from side to side in the mask.

A further object of our invention is the provision of a suitable structure of the type described which may be economically constructed.

With the above and other objects in view this invention consists substantially in the combination, arrangement and construction of parts all as hereinafter more fully described, shown in the accompanying drawings which form a part of this specification and illustrate the preferred embodiment of our invention, and more particularly set forth in the subjoined claims.

In the drawings:

Figure 1 is a fragmentary vertical section of a mask taken substantially on the line 1—1 of Fig. 2 and illustrating our invention supported therein;

Fig. 2 is a horizontal section taken substantially on the line 2—2 of Fig. 1;

Fig. 4 is a section similar to Fig. 2, illustrating the artificial eyes turned to the right of the mask;

Fig. 6 is a section similar to Figs. 2 and 4, illustrating the eyes turned to the left of the mask;

Figs. 3, 5, and 7 are fragmentary front elevations of the mask, illustrating the expressions produced by the positions of parts illustrated respectively in Figs. 2, 4, and 6;

Fig. 8 is a rear elevation of our invention with portions broken away for clearness; and Fig. 9 is a section similar to Fig. 1, illustrating a different position of the parts.

Similar numerals refer to similar parts throughout the several views. Reference numeral 10 indicates generally a mask, which may be an inanimate reproduction of any animate thing and may in our contemplation of the invention form an integral part of a doll or dummy animal. The mask 10 is provided with a left eye aperture 11 and a right eye aperture 12. Secured within the mask is any suitable supporting member 13, preferably comprising a stamped piece of sheet metal formed with a pair of lugs 14 stamped out of the metal and oppositely apertured to form a horizontal pivotal bearing for the yoke 15 which at the outer sides of the lugs curves downward at each end for approximately a quarter of a circle and bears at its bottom ends substantially vertical spindles 16 alined with the centers of the eye apertures 11 and 12. Monted upon each of the spindles 16 is an artificial eye 17 upon which is depicted, as usual, eye pupil 18 and iris 19 and white portion 20, and above these a pink strip 21 which, when the mask is tilted backward is exposed through the eye aperture, simulating the closing of a pair of eyelids. The eyes 17 are retained on the spindle by an offset upper end 22 on each spindle, the offset being preferably forward in order that it may contact with the wall of the mask 10 at a point above the eye aperture when the parts assume the position illustrated in Fig. 9, this being for the purpose of limiting the downward movement of the pupils of the eyes. Upward movement of the pupils of the eyes is limited by contact between the lower ends of yoke 15 and the outer ends 23 of a stop 24, which comprises preferably a wire bent about the support 13. It will be understood that the eyes are pivotally mounted upon the spindles 16 for free rotation thereon. Preferably the spindles pass centrally through the two eyes 17. Near the rear of each eye is provided a substantially vertical hole paralleling the bearing for the spindle 16 and in which are journaled the legs of a U-member 25 which depends below the eyes and carries a weight 26 disposed considerably below the lugs 14. To secure the U-member upon the eyes is upper ends above the eyes are oppositely inturned as at 27 and 28. The fingers 27 and 28 perform a further function in that they contact with the forward surface of a channel 29 cut in each eye to limit right and left movement of the eyes. For example, when the eyes are turned to the right of the mask as in Fig. 4, finger 27 engages the portion 29 of the eye to limit movement of the eyes to the right of the mask.

By swinging the yoke 15 upon a horizontal pivot and providing a weight carried by the eyes and depending below that horizontal pivot we provide for the well known sleeping position of the artificial eyes, as illustrated in Fig. 9, while at the same time permitting both eyes, when the mask is in the upright position of Fig. 1, to rotate upon vertical pivots and accomplish the movements of the pupils from side to side. By positioning the bearings of the U-member 25 eccentrically with respect to the bearings for the spindles 16, a slight jar of the mask will accomplish a shifting of the eye pupils from one side to the other, and by means of the weight 26 the ordinary inertia of the eyes is increased so that when the mask is in vertical position the eyes have a tendency to remain stationary with respect to the mask.

In employing our invention in connection with the ordinary child's doll the horizontal axis of yoke 15 will normally be alined with the centers of the substantially spherical eyes 17 (see Figs. 1 and 2), the spindles 16 will pass through the centers of the eyes, and the legs of the U-member 25 will be journaled in the respective eyes adjacent the rear extremity of each eye as illustrated. It is to be noted, however, that very grotesque expressions may be produced in comic dolls and toy animals by variations of these pivotal axes with respect to the artificial eyes; for example, should it be desired to give a comic doll a cross-eyed expression the legs of the U-member 25 could be spread apart slightly in excess of the distance between spindles 16, thereby throwing each pupil inwardly toward the nose of the mask; or these legs could be drawn slightly together, thus giving the doll a wall-eyed expression; or the bearings for the spindles could be positioned rearwardly of the centers of the eyes, thus giving the eyes an accentuated roll from left to right; or the horizontal bearing for yoke 15 could be positioned rearwardly of the centers of the eyes, giving an unnaturally increased up and down movement.

While we have illustrated and described the preferable embodiment of our invention, it will be understood that one skilled in the art may make modifications thereof without departing from the spirit of the invention. We wish therefore not to be restricted to the precise embodiment shown except in so far as the same is limited in the appended claims.

We claim:

1. The combination with a mask, of a vertically disposed supporting member mounted between the eyes thereof, a yoke pivotally mounted on said supporting member to swing about a horizontal axis, a pair of eyes carried by said yoke, a rigid, U-shaped link rotatably connected with each eye, the connecting axes between said link and said eyes being parallel with the axes of rotation of the eyes upon said yoke, a weight carried by said link below the eyes, and means for limiting the rotative movements of said eyes.

2. The combination with a mask, of a support disposed between the eye holes therein, a yoke pivoted on said support and having upturned parallel portions, a pair of eyes rotatably mounted upon said portions, a link comprising a pair of portions rotatably connected with said eyes about axes parallel with the axes of rotation of the eyes upon the yoke, a weight carried by said link whereby the eyes are rotated vertically and horizontally, means including the yoke for limiting the vertical rotation of the eyes, and means including the link for limiting the horizontal rotation of the eyes.

3. The combination with a mask, of a yoke pivotally mounted upon a horizontal axis, and having vertically disposed portions upon which a pair of eyes are rotatably mounted, a link rotatably connecting said eyes rearwardly of the rotatable connection between the eyes and yoke, and a weight carried by said link, the eyes and link being constructed to provide coöperating abutments to limit the horizontal movements of the eyes.

4. The combination with a support, of a pair of artificial eyes mounted thereon for rotation about parallel axes, a link pivoted to the eyes at points eccentric to said axes, and stops upon said link adapted to engage the eyes to limit their rotation in each direction.

5. The combination with a support, of a pair of artificial eyes mounted thereon for rotation about parallel axes, a link pivoted to the eyes at points eccentric to said axes, and oppositely offset stops formed on the link and adapted to engage the respective eyes to limit their rotation in each direction.

6. The combination with a support, of a pair of artificial eyes mounted thereon for rotation about parallel axes, and a link comprising a U member having its arms pivoted to the respective eyes and having the upper ends of its arms oppositely offset for engagement with the respective eyes to limit the rotation of both eyes in each direction.

7. The combination with a support, of a pair of artificial eyes mounted thereon for rotation about parallel axes, and a link comprising a U member having its arms engaging parallel bearings provided in said eyes eccentric to and parallel with said axes and having the upper ends of its arms oppositely offset for engagement with the respective eyes to limit the rotation of both eyes in each direction.

8. The combination with a mask, of a yoke horizontally pivoted therein, a pair of substantially vertical spindles carried by the yoke opposite eye apertures provided in the mask, a pair of artificial eyes pivoted upon the spindles, a link pivotally connected to the respective eyes, means for eccentrically weighting said eyes, devices carried by the yoke and engaging the mask to limit the downward movement of the eyes, a stop on the mask for contact with the yoke to limit the upward movement of the eyes, and oppositely offset detents for engagement with the eyes to limit their right and left rotations.

9. The combination with a mask, of a yoke horizontally pivoted therein, a pair of substantially vertical spindles carried by the yoke opposite eye apertures provided in the mask, a pair of artificial eyes pivoted upon the spindles, a link pivotally connected to the respective eyes, means disposed in the path of movement of the yoke for limiting the vertical rotations of the eyes, and means coöperating with said link to limit the horizontal rotation of said eyes.

10. The combination with a support, of a pair of artificial eyes each having a central bearing and a parallel eccentric bearing, a yoke horizontally pivoted to the support and carrying spaced vertical spindles respectively engaging said central bearings, a U member having its legs respectively engaging said eccentric bearings and its upper ends oppositely offset to retain the member in its bearings and to limit rotation of the eyes on the spindles in both directions and a weight carried by the U member.

MABEL P. SMITH.
PUTNAM D. SMITH.